(12) United States Patent
Kilgariff et al.

(10) Patent No.: US 9,142,040 B2
(45) Date of Patent: Sep. 22, 2015

(54) SYSTEM, METHOD, AND COMPUTER PROGRAM PRODUCT FOR PROCESSING GRAPHICS DATA ASSOCIATED WITH SHADING

(71) Applicant: NVIDIA Corporation, Santa Clara, CA (US)

(72) Inventors: Emmett M. Kilgariff, San Jose, CA (US); Tyson Bergland, San Francisco, CA (US); Dale L. Kirkland, Madison, AL (US); Rui Manuel Bastos, Porto Alegre (BR); Christian Jean Rouet, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 206 days.

(21) Appl. No.: 13/844,035

(22) Filed: Mar. 15, 2013

(65) Prior Publication Data

US 2014/0267355 A1    Sep. 18, 2014

(51) Int. Cl.
*G06T 11/00* (2006.01)
*G06T 1/20* (2006.01)
*G06T 15/00* (2011.01)
*G09G 5/02* (2006.01)

(52) U.S. Cl.
CPC ............... *G06T 11/001* (2013.01); *G06T 1/20* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 7,683,905 B1 * | 3/2010 | Kirk et al. | 345/506 |
| 2011/0242113 A1 * | 10/2011 | Keall et al. | 345/505 |
| 2011/0249011 A1 * | 10/2011 | Lalonde et al. | 345/522 |

* cited by examiner

*Primary Examiner* — Xiao Wu
*Assistant Examiner* — Matthew D Salvucci
(74) *Attorney, Agent, or Firm* — Zilka-Kotab, PC

(57) ABSTRACT

A system, method, and computer program product are provided for processing graphics data associated with shading. In operation, a first fragment is received. Further, the first fragment is shaded. While the first fragment is being shaded, a second fragment is received and it is determined whether at least one aspect of the second fragment conflicts with the first fragment. If it is determined that the at least one aspect of the second fragment does not conflict with the first fragment, the second fragment is shaded. If it is determined that the at least one aspect of the second fragment conflicts with the first fragment, information associated with the second fragment is stored, a third fragment is received, and the third fragment is shaded, if it is determined that at least one aspect of the third fragment does not conflict with the first fragment.

19 Claims, 7 Drawing Sheets

SYSTEM, METHOD, AND COMPUTER PROGRAM PRODUCT FOR PROCESSING GRAPHICS DATA ASSOCIATED WITH SHADING

FIELD OF THE INVENTION

The present invention relates to graphics processing, and more particularly to processing graphics data associated with shading.

BACKGROUND

Modern graphics processors make extensive use of programmable pixel shaders, which are user programs that are executed in parallel on several pixel samples. These programs do not currently allow hazard-free Read-Modify-Write operations. There is thus a need for addressing these and/or other issues associated with the prior art.

SUMMARY

A system, method, and computer program product are provided for processing graphics data associated with shading. In operation, a first fragment is received. Further, the first fragment is shaded. While the first fragment is being shaded, a second fragment is received and it is determined whether at least one aspect of the second fragment conflicts with the first fragment. If it is determined that the at least one aspect of the second fragment does not conflict with the first fragment, the second fragment is shaded. If it is determined that the at least one aspect of the second fragment conflicts with the first fragment, information associated with the second fragment is stored, a third fragment is received, and the third fragment is shaded, if it is determined that at least one aspect of the third fragment does not conflict with the first fragment.

DETAILED DESCRIPTION

Figure 1:
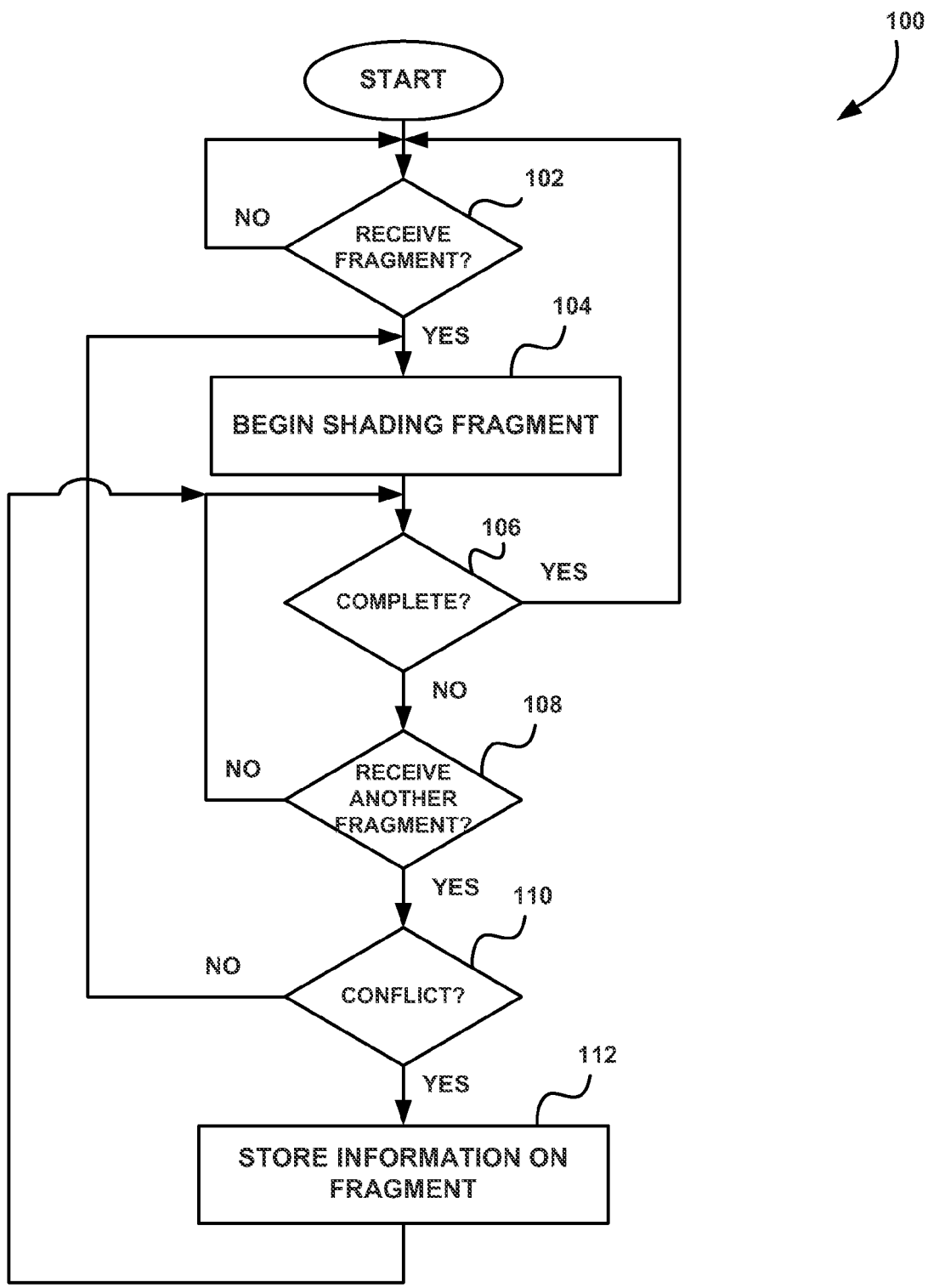
FIG. 1 shows a method for processing graphics data associated with shading, in accordance with one embodiment.

FIG. 1 shows a method 100 for processing graphics data associated with shading, in accordance with one embodiment.

In operation, it is determined whether a first fragment is received. See decision 102. In the context of the present description a fragment refers to data associated with a pixel. For example, in one embodiment, the fragment may include data capable of being utilized to shade a pixel. In one embodiment, multiple fragments may be received (e.g. data associated with a 16×16 pixel array, an 8×8 pixel array, a 4×4 pixel array, etc.).

In one embodiment, a fragment processing pipeline (or components thereof) may determine whether the first fragment is received. In one embodiment, the fragment processing pipeline may include a shader and one or more shader interlock components. In one embodiment, the shader interlock may be capable of functioning to ensure that only one instance of any sample location is shaded at one time.

If a first fragment is received, the first fragment is shaded. See operation 104. As shown further, it is determined whether the shading of the first fragment is complete. See decision 106. Shading refers to the process of executing an arbitrary user program on graphics data. Pixel Shading refers to the process of executing an arbitrary user program on pixel data or a fragment.

If the shading of the first fragment is not complete, it is determined whether a second fragment is received, while the first fragment is being shaded. See decision 108. If a second fragment is received, while the first fragment is being shaded, the second fragment is received and it is determined whether at least one aspect of the second fragment conflicts with the first fragment. See decision 110.

If it is determined that at least one aspect of the second fragment does not conflict with the first fragment, the second fragment is shaded. If it is determined that at least one aspect of the second fragment conflicts with the first fragment, information associated with the second fragment is stored. See operation 112. Furthermore, shading associated with the first fragment is continued until complete.

Still yet, a third fragment may be received, and the third fragment may be shaded, while the first fragment is being shaded, if it is determined that at least one aspect of the third fragment does not conflict with the first fragment. In one embodiment, the aspect for determining a conflict may include a position. For example, if a position associated with the first fragment conflicts with a position associated with the second fragment, while the first fragment is being shaded, information associated with the second fragment may be stored. In this case, in one embodiment, the information associated with the second fragment may be held until the shading of the first fragment has completed.

Once the shading of the first fragment has completed, the information associated with the second fragment may be accessed and shading of the second fragment may begin if it is determined not to conflict with other fragments being shaded. In this way, if the fragments are associated with the same pixel and or pixels, a correct shading order may be maintained. In various embodiments, the position may include a coordinate position (e.g. an (x,y) coordinate position, etc.), a screen position, a memory position, and/or any other position associated with a fragment.

Further, in one embodiment, the at least one aspect may include pixel coverage. For example, in one embodiment, if it determined that the first fragment is associated with information that covers a first set of one or more pixels, and it is determined that the second fragment is associated with information that covers a second set of one or more pixels, where the second set of one or more pixels overlaps one or more of the first set of one or more pixels (e.g. on a screen, based on coordinates, in memory, etc.), then it may be determined that the second fragment conflicts with the first fragment.

In one embodiment, the determination of whether the at least one aspect of the second fragment conflicts with the first fragment may include a hierarchical determination. For example, in one embodiment, a first tier of the hierarchy may include 16×16 pixel tile, a second tier of the hierarchy may include four 4×4 adjacent tiles (e.g. an 8×8 tile, etc.), and a third tier of the hierarchy may include a pixel sample level. In this case, in one embodiment, it may be determined whether there is a conflict between fragments at each hierarchical level.

Furthermore, in one embodiment, the determination of whether the at least one aspect of the second fragment conflicts with the first fragment may includes a first determination of whether at least one coordinate of the second fragment conflicts with at least one coordinate associated the first fragment. Additionally, the determination of whether the at least one aspect of the second fragment conflicts with the first fragment may further include a second determination of whether a pixel coverage of the second fragment conflicts with a pixel coverage associated the first fragment. In this case, in one embodiment, the first determination may precede the second determination.

Still yet, in one embodiment, a conflict between different fragments may be determined by tracking coordinates associated with each fragment. For example, in one embodiment, at least one coordinate associated with the first fragment may be identified. Further, a receipt of the at least one coordinate associated with the first fragment may be indicated. In one embodiment, indicating the receipt of the at least one coordinate associated with the first fragment may include setting a bit. For example, in one embodiment, each coordinate associated with a pixel (or fragment, etc.) may be associated with a bit in a bit map. Accordingly, in one embodiment, when a fragment associated with a coordinate is received, a corresponding bit in the bit map may be set (e.g. to '1', etc.), such that a conflict will be known if another fragment is received with the same coordinate (e.g. by referencing the bit map, etc.).

In another embodiment, indicating the receipt of the at least one coordinate associated with the first fragment may include storing a value associated with the at least one coordinate. For example, in one embodiment, when a fragment associated with a coordinate is received, the coordinate value may be saved, such that a conflict will be known if another fragment is received with the same coordinate (e.g. by performing a look-up, etc.). In another embodiment, when a fragment associated with a coordinate is received, the coordinate value may be marked on a coordinate map, such that a conflict will be known if another fragment is received with the same coordinate (e.g. by referencing the map, etc.).

In one embodiment, a value may be assigned to a fragment, when the fragment is received. For example, in one embodiment, when the first fragment is received, a first counter value or ticket may be associated with the first fragment. In one embodiment, the first counter value or ticket may indicate an order in which fragments were received. Further, in one embodiment, once the first counter value is issued to the first fragment, an interlock associated with the first fragment may be released (e.g. processing of the first fragment may proceed, etc.).

Additionally, in one embodiment, a counter associated with fragment coordinates may be incremented. In one embodiment, once the first fragment reaches a critical processing section, the fragment may be associated with a second counter value associated with at least one pixel coordinate that is currently associated with processing. Moreover, in one embodiment, when the first counter value is equal to the second counter value, the critical processing section associated with the first fragment may be exited. In the context of the present description, a critical processing section refers to a time in the processing of a fragment where conflicts may occur (e.g. associated with a memory read, or memory mite, etc.).

Further, in one embodiment, the first fragment may be received by a pixel shader in a first order and released by the pixel shader in a second order different from the first order. For example, in one embodiment, the pixel shader may release fragments out-of-order.

Still yet, in one embodiment, a shader (or components thereof) may determine whether the at least one aspect of the second fragment conflicts with the first fragment. In one embodiment, a pixel shader interlock may be configured to perform the determining. Additionally, in one embodiment, a queue associated with the pixel shader interlock may be configured to perform the storing information associated with the second fragment.

Further, in one embodiment, the shading of fragments may be performed in association of the same warp or group of pixels. In one embodiment, the method 100 may include ensuring that all fragments associated with a warp correspond to different coordinates. In other words, in one embodiment, a warp may not process overlapping fragments. For example, in one embodiment, the shading of the third fragment may be performed in association with a first warp that is associated with the shading of the first fragment, only if coordinates associated with the third fragment fail to conflict with coordinates associated with the first fragment.

While the present Figure is described in the context of fragments, it should be noted that such description applies to individual pixels and/or groups of pixels. Furthermore, in one embodiment, the method 100 may be implemented utilizing a fully programmable processor.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
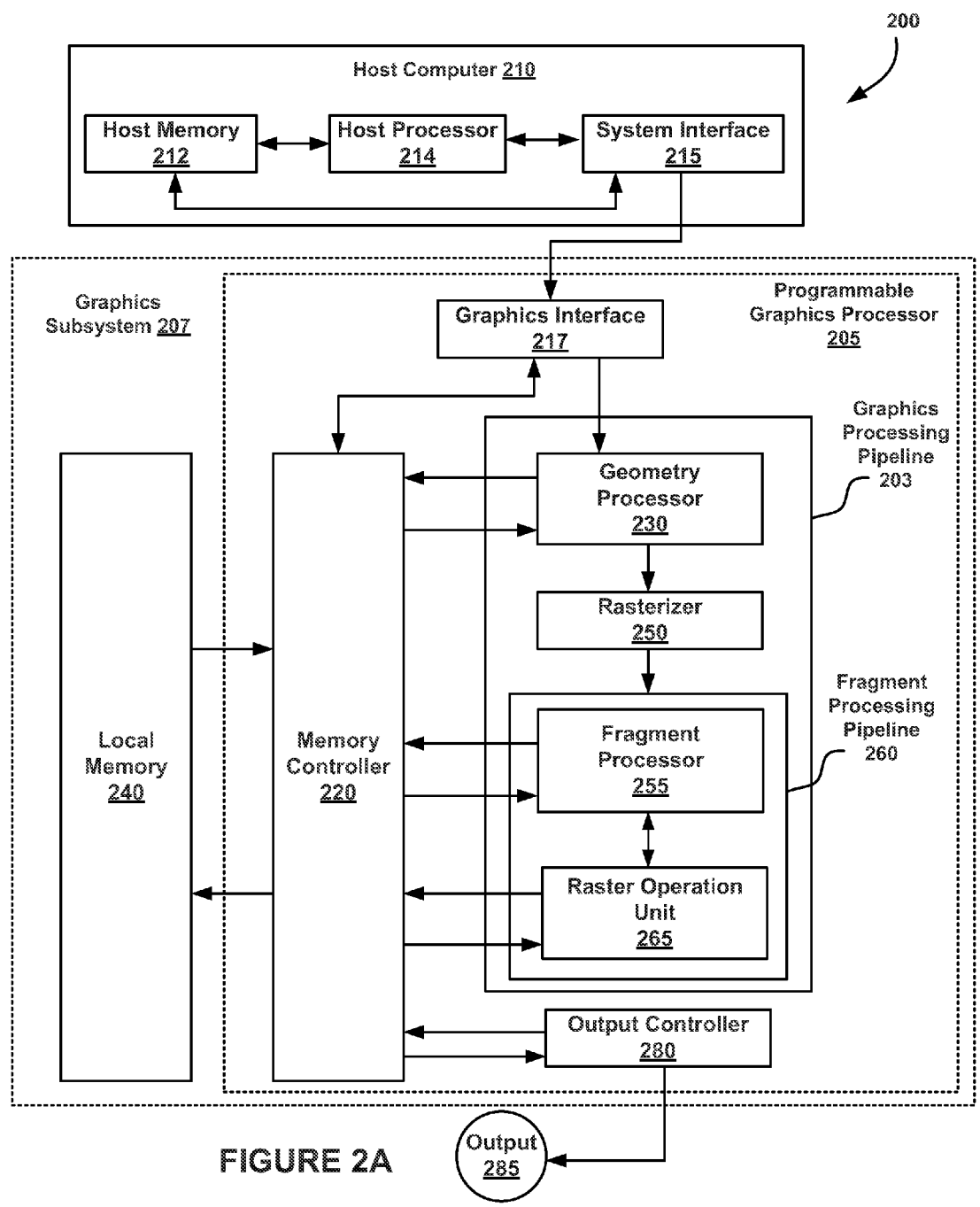
FIG. 2A shows a block diagram of a computing system, in accordance with one embodiment.

FIG. 2A shows a block diagram of a computing system 200, in accordance with one embodiment. As an option, the system 200 may be implemented in the context of the previous Figure and/or any subsequent Figure(s). Of course, however, the system 200 may be implemented in any desired environment. It should also be noted that the aforementioned definitions may apply during the present description.

As shown, the computing system 200 includes a host computer 210 and a graphics subsystem 207. In various embodiments, the computing system 200 may be a desktop computer, server, laptop computer, palm-sized computer, tablet computer, game console, cellular telephone, computer-based simulator, or the like. The host computer 210 includes a host processor 214 that may include a system memory controller to interface directly to a host memory 212 or may communicate with the host memory 212 through a system interface 215. The system interface 215 may be an I/O (input/output) interface or a bridge device including the system memory controller to interface directly to the host memory 212.

The host computer 210 communicates with the graphics subsystem 207 via the system interface 215 and a graphics interface 217. The graphics subsystem 207 may include a local memory 240 and a programmable graphics processor 205. The programmable graphics processor 205 uses memory to store graphics data and program instructions, where graphics data is any data that is input to or output from computation units within the programmable graphics processor 205.

Graphics memory refers to any memory used to store graphics data or program instructions to be executed by the programmable graphics processor 205. The graphics memory may include portions of the host memory 212, the local memory 240 directly coupled to the programmable graphics processor 205, register files coupled to the computation units within the programmable graphics processor 205, and the like.

In addition to the graphics interface 217, the programmable graphics processor 205 may include a graphics processing pipeline 203, a memory controller 220 and an output controller 280. Data and program instructions received at the graphics interface 217 may be passed to a geometry processor 230 within the graphics processing pipeline 203 or written to the local memory 240 through the memory controller 220. The memory controller 220 includes read interfaces and write interfaces that each generate address and control signals to the local memory 240, storage resources, and the graphics interface 217. Storage resources may include register files, caches, FIFO (first in first out) memories, and the like.

In addition to communicating with the local memory 240, and the graphics interface 217, the memory controller 220 also communicates with the graphics processing pipeline 203 and the output controller 280 through read and write interfaces in the graphics processing pipeline 203 and a read interface in the output controller 280. The read and write interfaces in the graphics processing pipeline 203 and the read interface in the output controller 280 generate address and control signals to the memory controller 220.

Within the graphics processing pipeline 205, the geometry processor 230 and a programmable graphics fragment processing pipeline, a fragment processing pipeline 260, perform a variety of computational functions. Some of these functions may include table lookup, scalar and vector addition, multiplication, division, coordinate-system mapping, calculation of vector normals, tessellation, calculation of derivatives, interpolation, and the like.

The geometry processor 230 and the fragment processing pipeline 260 are optionally configured such that data processing operations are performed in multiple passes through the graphics processing pipeline 203 or in multiple passes through the fragment processing pipeline 260. Each pass through the programmable graphics processor 205, the graphics processing pipeline 203 or the fragment processing pipeline 260 may conclude with optional processing by a raster operation unit 265. In one embodiment, data produced in a pass through the programmable graphics processor 205, the graphics processing pipeline 203 or the fragment processing pipeline 260 may be written to a buffer in graphics memory to be read from during a subsequent pass.

Vertex programs are sequences of vertex program instructions compiled by the host processor 214 for execution within the geometry processor 230 and the rasterizer 250. Fragment programs are sequences of fragment program instructions compiled by the host processor 214 for execution within the fragment processing pipeline 260. The graphics processing pipeline 203 receives a stream of program instructions (vertex program instructions and fragment program instructions) and data from the graphics interface 217 or the memory controller 220, and performs vector floating-point operations or other processing operations using the data.

The program instructions configure subunits within the geometry processor 230, the rasterizer 250 and the fragment processing pipeline 260. The program instructions and data are stored in graphics memory. When a portion of the host memory 212 is used to store program instructions and data, the portion of the host memory 212 can be uncached so as to increase performance of access by the programmable graphics processor 205. Alternatively, configuration information may be written to registers within the geometry processor 230, the rasterizer 250 and the fragment processing pipeline 260 using program instructions, encoded with the data, or the like.

Data processed by the geometry processor 230 and program instructions are passed from the geometry processor 230 to a rasterizer 250. The rasterizer 250 is a sampling unit that processes graphics primitives and generates sub-primitive data, such as pixel data or fragment data, including coverage data. Coverage data indicates which subpixel sample positions within a pixel are "covered" by a fragment formed by the intersection of the pixel and a primitive. Graphics primitives include geometry, such as points, lines, triangles, quadrilaterals, meshes, surfaces, and the like. The rasterizer 250 converts graphics primitives into sub-primitive data, performing scan conversion on the data processed by the geometry processor 230. The rasterizer 250 outputs fragment data and fragment program instructions to the fragment processing pipeline 260.

The fragment programs may configure the fragment processing pipeline 260 to process fragment data by specifying computations and computation precision. A fragment processor 255 optionally is configured by fragment program instructions such that fragment data processing operations are performed in multiple internal passes within the fragment processor 255. The fragment processor 255 outputs processed fragment data and codewords generated from fragment program instructions to the raster operation unit 265. The raster operation unit 265 includes a read interface and a write interface to the memory controller 220 through which the raster operation unit 265 accesses data stored in one or more buffers in the local memory 240 or the host memory 212. The raster operation unit 265 optionally performs near and far plane clipping and raster operations, such as stencil, z test, blending, and the like, using fragment data read from the one or more buffers in the local memory 240 or the host memory 212 at the x,y position associated with the fragment data and the processed fragment data to produce output data. The output data from the raster operation unit 265 may be written back to the local memory 240 or the host memory 212 at the x,y position associated with the output data.

In various embodiments the memory controller 220, the local memory 240, and the geometry processor 230 may be configured such that data generated at various points along the graphics processing pipeline 203 may be output via the raster operation unit 265 and provided to the geometry processor 230 or the fragment processor 255 as input.

The output data is represented in one or more formats as specified by the codewords. For example, color data may be written as 16, 32, 64, or 128 bits per pixel fixed or floating-point RGBA (red, green, blue, and alpha) to be scanned out for display. As a specific example, four 16-bit floating-point components (RGBA) are combined forming 64 bits of color data for each fragment. The output data, e.g., color, depth, and other parameters, may be processed according to a fragment program and stored in a buffer in graphics memory to be used as a texture map, e.g., shadow map, height field, stencil, and the like, by the fragment program. Alternatively, color and depth output data may be written to a buffer, and later read and processed by the raster operation unit 265 to generate the final pixel data prior to being scanned out for display via the output controller 280.

For example, the fragment processing pipeline 260 may be configured by fragment program instructions to produce processed data and store the processed data in a buffer in the local memory 240. The fragment processing pipeline 260 may be configured by the fragment program instructions to read and further process the processed data. For example, the fragment processing pipeline 260 may be configured to implement a modified depth buffer algorithm, e.g., sorting and maintaining more than one depth value for each pixel. A modified depth buffer algorithm may be used to implement correct transparency by rendering fragments in back to front order while applying transparency blending.

In one embodiment, a shading pipeline, such as the fragment processing pipeline 260, may be flushed (using a flush instruction) prior to executing fragment program instructions that read the shadow map to avoid any read-after-write (RAW) conflicts. A RAW conflict exists when a write to an (x,y) position within a buffer is pending when a read from the same (x,y) position in the buffer is received. The RAW conflict is removed when the write to the (x,y) position within the buffer is completed. In various embodiments, a flush may not be issued between writing a buffer and reading the buffer as an input to a fragment processor 255.

When processing is completed, an output 285 of the graphics subsystem 207 is provided using the output controller 280. Alternatively, the host processor 214 reads the composited frame, e.g., buffer, stored in the local memory 240 through the memory controller 220, the graphics interface 217 and the system interface 215. The output controller 280 is optionally configured by opcodes, received from the graphics processing pipeline 203 via the memory controller 220, to deliver data to a display device, network, electronic control system, other computer system, other graphics subsystem, or the like.

Figure 2B:
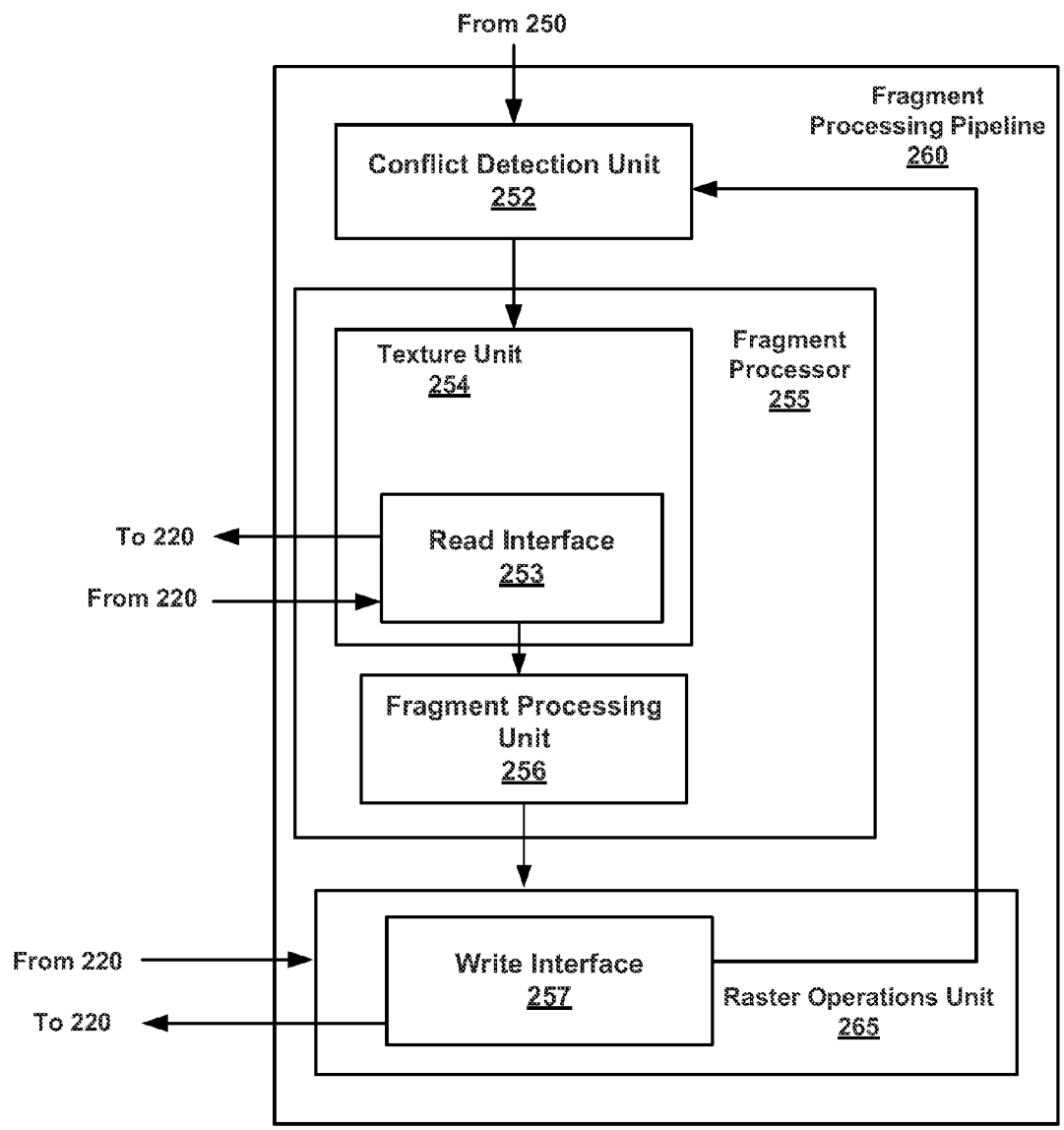
FIG. 2B shows a block diagram of the fragment processing pipeline of FIG. 2A, in accordance with one embodiment.

FIG. 2B shows a block diagram of the fragment processing pipeline 260 of FIG. 2A, in accordance with one embodiment. In operation, in one embodiment, a conflict detection unit 252 may receive fragment data and/or fragment program instructions from the rasterizer 250 (of FIG. 2A). In another embodiment, the conflict detection unit 252 may be included within the rasterizer 250. In another embodiment, the conflict detection unit 252 may be included within the fragment processor 255.

In one embodiment, the conflict detection unit 252 may determine if a conflict (e.g. a RAW conflict, etc.) exists for each source read of a position in a buffer. Further, in one embodiment, the conflict detection unit 252 may output the fragment program instructions to the fragment processor 255. In this case, the fragment data may be processed by the fragment processor 255 according to the fragment program instructions.

In one embodiment, a texture unit 254, within the fragment processor 255, may receive the fragment data and fragment program instructions output by the conflict detection unit 252. Additionally, in one embodiment, a read interface 253, within the texture unit 254, may read additional fragment program instructions and buffer data (e.g. texture map, height field, bump map, shadow map, jitter values, etc.) from the local memory 240 or the host memory 212, via the memory controller 220. In various embodiments, the buffer data stored in the graphics memory may be generated by the programmable graphics processor 205, by the host processor 214, by another device, by a human, or the like.

The memory controller 220 may output the buffer data and the additional fragment program instructions to the read interface 253. The texture unit 254 may output the buffer data, processed fragment data, and/or the additional fragment program instructions to a fragment processing unit 256. In one embodiment, the fragment processing unit 256 may process the processed buffer data and processed fragment data as specified by the additional fragment program instructions and output shaded fragment data, e.g., x, y, color, depth, configuration control, other parameters, to the raster operation unit 265. In one embodiment, the fragment processing unit 256 may be configured to process two or more fragments in parallel. Additionally, in one embodiment, the conflict detection unit 252 and/or the read interface 253 may be configured to process at least two fragments in parallel.

The raster operation unit 265 optionally processes the shaded fragment data according to the configuration control. A write interface 257 within the raster operation unit 265 may write the optionally processed shaded fragment data to a buffer stored in the local memory 240 or the host memory 212, via the memory controller 220. In one embodiment, the write interface 257 may also output write position information to the conflict detection unit 252 to update the status of position conflicts.

In one embodiment, the fragment processing pipeline 260 may include a pixel shader unit. Further, in one embodiment, an interlock mechanism may be implemented around the pixel shader unit.

Figure 3:
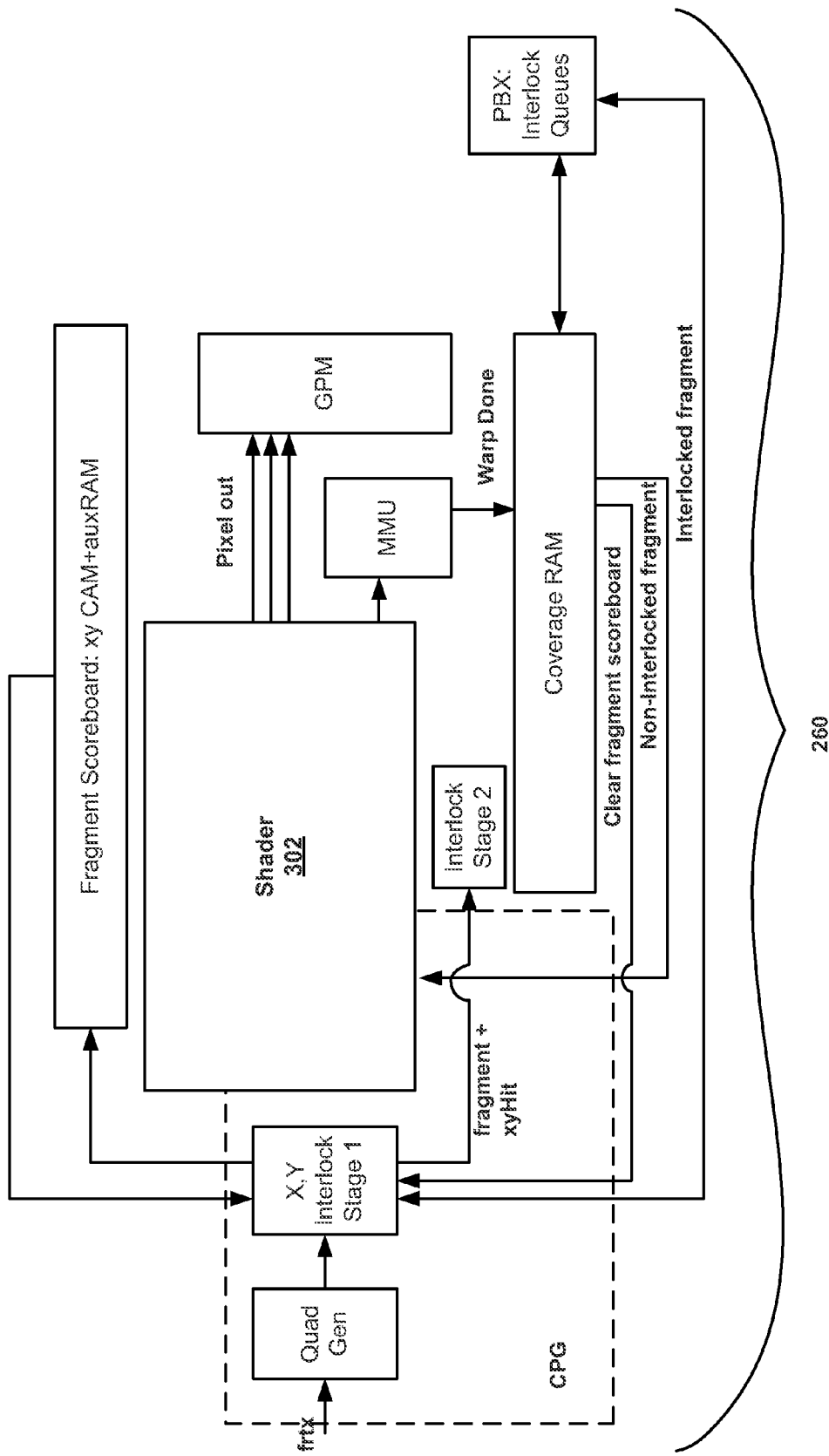
FIG. 3 shows the fragment processing pipeline of FIG. 2A and FIG. 2B, in accordance with another embodiment.

FIG. 3 shows the fragment processing pipeline 260 of FIG. 2A and FIG. 2B, in accordance with one embodiment. As an option, the fragment processing pipeline 260 may be implemented in the context of the functionality and architecture of the previous Figures and/or any subsequent Figure(s). Of course, however, the fragment processing pipeline 260 may be implemented in any desired environment. It should also be noted that the aforementioned definitions may apply during the present description.

As shown, the fragment processing pipeline 260 may include a pixel shader unit 302. Further, in one embodiment, a pixel interlock mechanism may be implemented around the pixel shader unit 302 (e.g. see Interlock Stage 1, and Interlock Stage 2, etc.). Further, in one embodiment, the interlock mechanism may include interlock queues (e.g. PXB Interlock Queues, etc.).

In operation, a first interlock stage may check for conflicts in the (x,y) coordinates (e.g. Interlock Stage 1, etc.) in associated with one or more fragments (e.g. a 2×2 pixel sample, etc.). If there is a conflict, the conflicting fragment may be sent to a second coverage interlock stage (e.g. Interlock Stage 2, etc.) that checks for pixel sample coverage conflicts. For example, in one embodiment, the second interlock stage may include a finer resolution conflict check than the first interlock stage.

In one embodiment, the pixel shader interlock may be operable to ensure that only one instance of any pixel sample location is shaded at one time. For example, in one embodiment, if a subsequent pixel sample conflicts with a pixel sample that is currently being shaded, then shading of the subsequent pixel sample may wait until that previous pixel sample completes execution and clears the interlock. In one embodiment, multiple conflicts may be processed in a primitive API order.

Further, in one embodiment, the pixel shader interlock may be responsible for reading and writing all associated data through a load/store texture path, within a "critical section." In this case, in one embodiment, nothing may flow back from the pixel shader to a standard fixed-function graphics pipeline. In one embodiment, a Z-test may be enabled prior to a pixel shader invocation. In another embodiment, a pixel shader may perform Z-operations (e.g. Z-testing, etc.).

In one embodiment, the pixel shader interlock functionally may be implemented in the context of programmable blending, thus providing more flexibility than fixed-function blending. Additionally, in one embodiment, the pixel shader may be configured to implement Order Independent Transparency (OIT), where the pixel shader sorts and/or merges fragments before compositing them, relying on hazard-free Read-Modify-Write memory transactions.

Furthermore, in one embodiment, pixel shader interlock may be applied to pixel samples in any order, not assuming regular patterns within tiled region. In this case, in one embodiment, the pixel shader interlock may leverage a screen hierarchy (e.g. Cached-Tiled, TC-tiles, Pixel Quads, sample coverage, etc.), in order to reduce storage requirements.

In one embodiment, the pixel shader interlock may be positioned to minimize false conflicts and reduce latency. For example, in one embodiment, the pixel shader interlock may be positioned to acquire data after an early Z-test and to release data before a crossbar. Still yet, in one embodiment, the pixel shader may be configured such that a critical section is positioned anywhere desired in the pixel shader.

In various embodiments, utilizing the pixel shader interlock may reduce an overall latency by releasing the interlock out-of-order, by using a fast-write-ack from a common node (MMU) earlier than L2 memory, by preventing stalling on conflicts by using large interlock queues, and/or by allowing subsequent non-conflicting transactions to bypass conflicting transactions. In use, in one embodiment, one or more APIs may enable the pixel shader interlock mode. In one embodiment, a compiler may analyze the pixel shader to detect the critical section automatically (e.g. based on surface targets load/store accesses, etc.).

Figure 4:
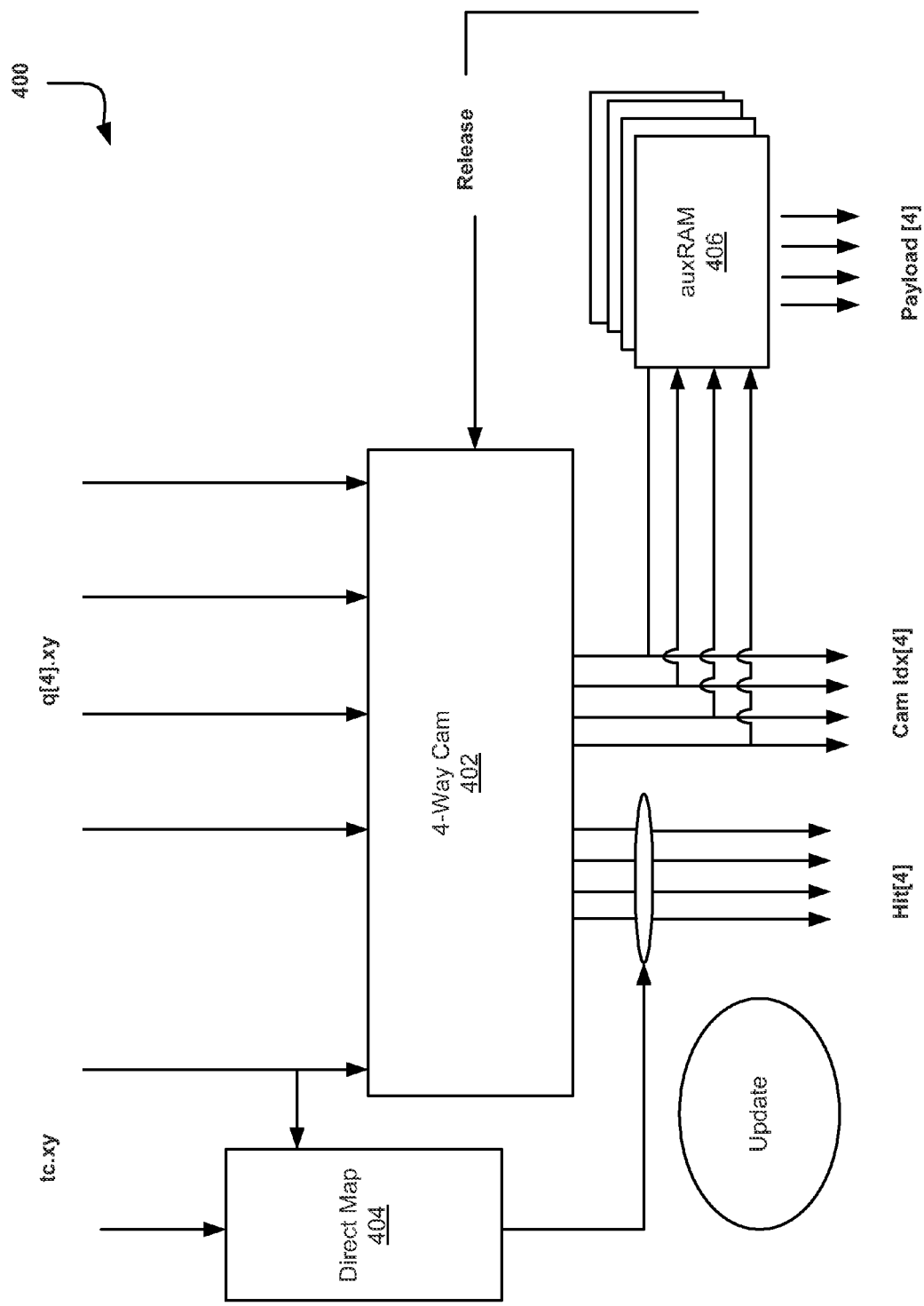
FIG. 4 shows a pixel shader interlock subsystem of a fragment processing pipeline, in accordance with one embodiment.

FIG. 4 shows a pixel shader interlock subsystem 400 of a fragment processing pipeline, in accordance with one embodiment. As an option, the subsystem 400 may be implemented in the context of the functionality and architecture of the previous Figures and/or any subsequent Figure(s). Of course, however, the subsystem 400 may be implemented in any desired environment. It should also be noted that the aforementioned definitions may apply during the present description.

As shown, the subsystem 400 may include a 4-Way CAM 402, a map unit 404, and RAM 406. In one embodiment, the CAM 402 may be capable of being used to store incoming fragment information (in flight), such that new fragment transactions may be checked against transactions in flight. In one embodiment, the subsystem 400 may be configured to avoid self-conflicts within fragments (e.g. within quad-quads by forcing endOfSubtile, etc.). Furthermore, in one embodiment, each of four incoming quad coordinates may be compared against all quads (2×2 pixel groups) in flight (e.g. the four quad coordinates share the same 3+3-bits TC-tile coordinates, etc.). In one embodiment, the subsystem 400 may be implemented as part of a pixel shader interlock.

In operation, in one embodiment, a pixel shader associated with the subsystem 400 may only allow one thread/address to perform reads and writes during a critical region of ROP-like functionality. For example, in one embodiment, a thread may be prevented from being launched if the possibility of a conflict exists. In one embodiment, rules for determining the possibility of a conflict may include a current fine raster transaction (i.e. an 8×8 pixel sample) conflicting with a previous fine raster transaction as part of the same TC-tile (i.e. a 16×16 pixel sample). In this case, a fine raster transaction may refer to transaction associated with 8×8 pixel samples and a TC-tile may refer to a 16×16 pixel sample that coalesces up to 128 fine raster transactions across 32-bins. This embodiment may take advantage of the fact that the tile coalesce will increase the locality of access to the tile, reducing the chances that an address associated with a tile will conflict with another tile already downstream of the current tile.

In one embodiment, conflict detect circuitry associated with the pixel shader interlock may be utilized to detect a conflict. In once embodiment, the conflict detect circuitry may include a unit that looks at a current tile address and coverage bits sent downstream to see if there are any intra-tile conflicts. In one embodiment, a RAM (e.g. the RAM 406, etc.) may be used to store the current coverage bits. In one embodiment, least-significant address bits may be used to select a RAM entry.

Additionally, in one embodiment, the conflict detect circuitry associated with the pixel shader interlock may include a CAM (e.g. the 4-Way CAM 402, etc.) that compares the current tile address against all tiles in flight between conflict detect logic and a unit where a tile processed flag is generated. In this case, in one embodiment, tiles may be removed from the CAM 402 when the tile exits the shader. For example, a packet may be sent over indicating which (x,y) coordinate CAM 402 entry should be removed.

Further, in one embodiment, the current fine raster transaction may be stalled if an intra-tile conflict occurs at the sample level, or the current tile address conflicts with another tile address in flight (e.g. conflicts at the tile address level, etc). In some cases, the same tile address may be in flight multiple times (e.g. if rendering long skinny triangles, etc.), however, flexible blending operations will be enabled.

Additionally, in one embodiment, the pixel shader may invalidate all cache lines for render target coordinates (x,y) it is using in the ROP-like section at the start of the pixel shader. In this way, multiple warps in a tile may invalidate the same lines, but well before they subsequently fetch data from those lines. In one embodiment, to ensure there is not a conflict when tiny triangles overflow a given TC-tile, a tile conflict circuit may not update the tile location, and the tile coordinates may be pushed to the CAM 402 if the old tile coordinates match the current tile coordinates.

In another embodiment, a data stream may not be completely stalled when a conflict occurs. For example, in one embodiment, the conflicting tile may be stored until the conflict is resolved, allowing non-conflicting tiles to make forward progress.

In yet another embodiment, the pixel shader may receive an instruction right before the critical region (e.g. ROP read, or ROP write) and the critical region may extend until the shader exits. In this case, in one embodiment, the conflict detect logic may keep track of the number of times a tile has a conflict by incrementing a tile counter on each conflict. The tile count may be sent to the shader, and when the instruction issues, a message may be sent to the conflict detection circuit.

In one embodiment, the conflict detection circuit may compare this value with the lock counter value. If the values match, a notification of success may be sent back to the shader. If the values do not match, a notification of failure may be sent to the shader. In one embodiment, when a tile exits the shader, the corresponding lock counter in the conflict detect circuit may be incremented. When the allocate counter is equal to the lock counter, it may be determined that no tiles are in flight and the CAM entry may be removed. Further, in one embodiment, the conflict detect logic may function to prevent multiple tile conflicts in a warp.

In another embodiment, conflicting transactions may occupy the same warp. For example, in one embodiment, the shader may determine if the lock counter for a given coordinate (x,y) is equal to the allocate counter. Additionally, in one embodiment, predicates may be set if there is a match, and used as a conditional on the critical code. This may function to allow some piels in a warp to perform the critical segment, while other warps skip the critical segment.

Further, in one embodiment, the winning pixels in the warp may increment another counter (e.g. a tile count counter, locTilecount, etc.) allowing the next pixels to go forward. In one embodiment, the increment value may be coalesced across all pixels to the same fine raster transaction tile in the warp (with the predicate bit set), incrementing only once per warp per tile ID. In addition, in one embodiment, a counter (e.g. "allocID," etc.) may be incremented when a raster tile crosses a warp boundary. In this case, in one embodiment, non-conflicting pixels of different warps may have different counters (e.g. allocIDs, etc.), such that the increment operation performs correctly.

Table 1 shows pseudo-code for setting predicates, in accordance with one embodiment.

TABLE 1

```
LockTileCount = 0
While(LockTileCount < AllocateTileCount)
{
    LockTilecount = readTileCount(X,Y)
    Predicate = LockTileCount == AllocateTileCount)
    // Section of code executed if tilecounts are equal (predicate set).
    Result = if (Predicate) { algorithm( )}
    If(Predicate) incrementTileCount(X,Y)
}
```

Table 2 shows pseudo-code for inserting a release suffix, in accordance with one embodiment.

TABLE 2

```
//---- Load Destination Targets early, including compression predicate
... // (skip loads if readSuppress blend condition is true)
//---- Shade Pixel, producing src data
...
//---- Perform Blending (per pixel or sample based on compression
predicate)
... // (skip blending if fillOverride blend condition is true)
    if blendOptKill condition is false :
        SUST.MS dstTarget0+xyOffset, srcMask, data0;
        ...  // Store arbitrary number of targets
    if oncePerWarp( ):   // must send reflected write even if entire warp is
"killed"
        waitForFastWriteAck( ):
        sendWarpReleaseToProp(S2R_PROP_WARPID);
```

Table 3 shows pseudo-code for performing an early warp release, in accordance with one embodiment.

TABLE 3

```
if oncePerWarp( ): sendWarpReleaseToProp(S2R_PROP_WARPID);
// release warp early
myTicket= LD(newTicket);
//---- Execute pre-critical region (e.g. Shade Pixel)
...
do:   serving = LD(ticketAdr);   // spin before critical region
(~500 clk latency)
until  myTicket = serving; // all threads of a warp are served together
//---- Execute critical region X (e.g. Load-Blend-Store)
...
if oncePerWarp( ):
    waitForFastWriteAck( )
    ATOM.ADD ticketAdr, 1;   // serve next ticket
//---- Execute post-critical region Y (if any)
...
```

Figure 5:
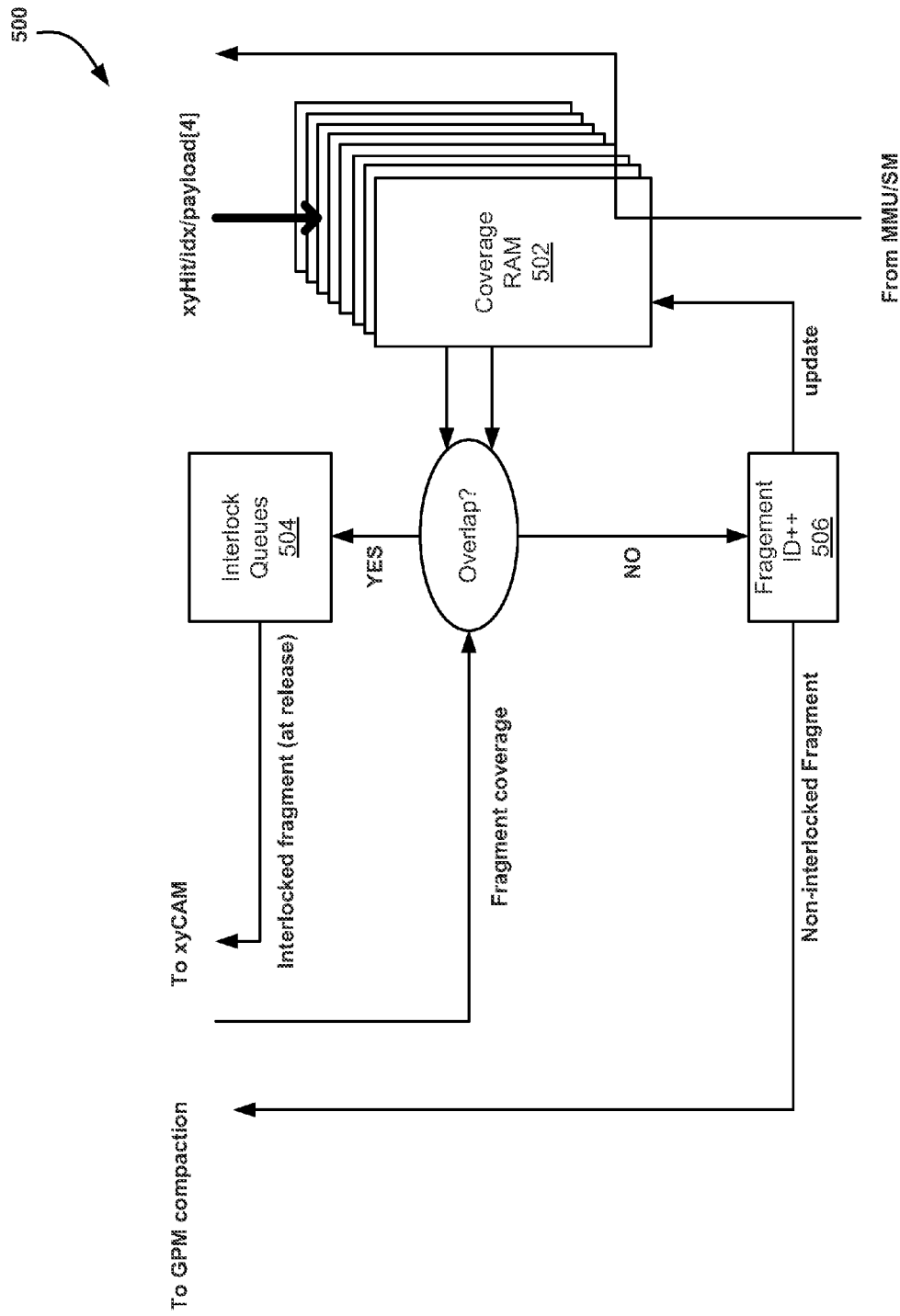
FIG. 5 shows a block diagram of a pixel shader interlock subsystem associated with a fragment processing pipeline, in accordance with one embodiment.

FIG. 5 shows a block diagram of a conflict detection subsystem 500 associated with a fragment processing pipeline, in accordance with one embodiment. As an option, the subsystem 500 may be implemented in the context of the functionality and architecture of the previous Figures and/or any subsequent Figure(s). Of course, however, the subsystem 500 may be implemented in any desired environment. It should also be noted that the aforementioned definitions may apply during the present description.

As shown, the subsystem 500 may include one or more interlock queues 504, coverage RAM 502, and, in one embodiment, a counter 506. In operation, if it is determined quad (2×2 pixel tile) coverage is overlapping, the overlapping quad information may be sent to the interlock queues 504 until the conflict is resolved (e.g. the quad is released to the CAM 402 of FIG. 4, etc.). In one embodiment, if a quad (i.e. a 2×2 pixel section, etc.) conflicts in (x,y) within the same TC-tile (i.e. a 16×16 pixel section, etc.), the coverage may be checked against up to two quads at the same (x,y) location.

Furthermore, in one embodiment, four quads may be processed in parallel. In this case, in one embodiment, if any pixel conflicts, the four quads (i.e. the quad-quad) may be pushed into the interlock queues 504.

In one embodiment, the counter 506 may be utilized to uniquely identify each quad-quad packet that is sent to the pixel shader. Further, in one embodiment, the unique identity of the quad-quad may be utilized to index the quad-quad in the coverage RAM 504.

Figure 6:
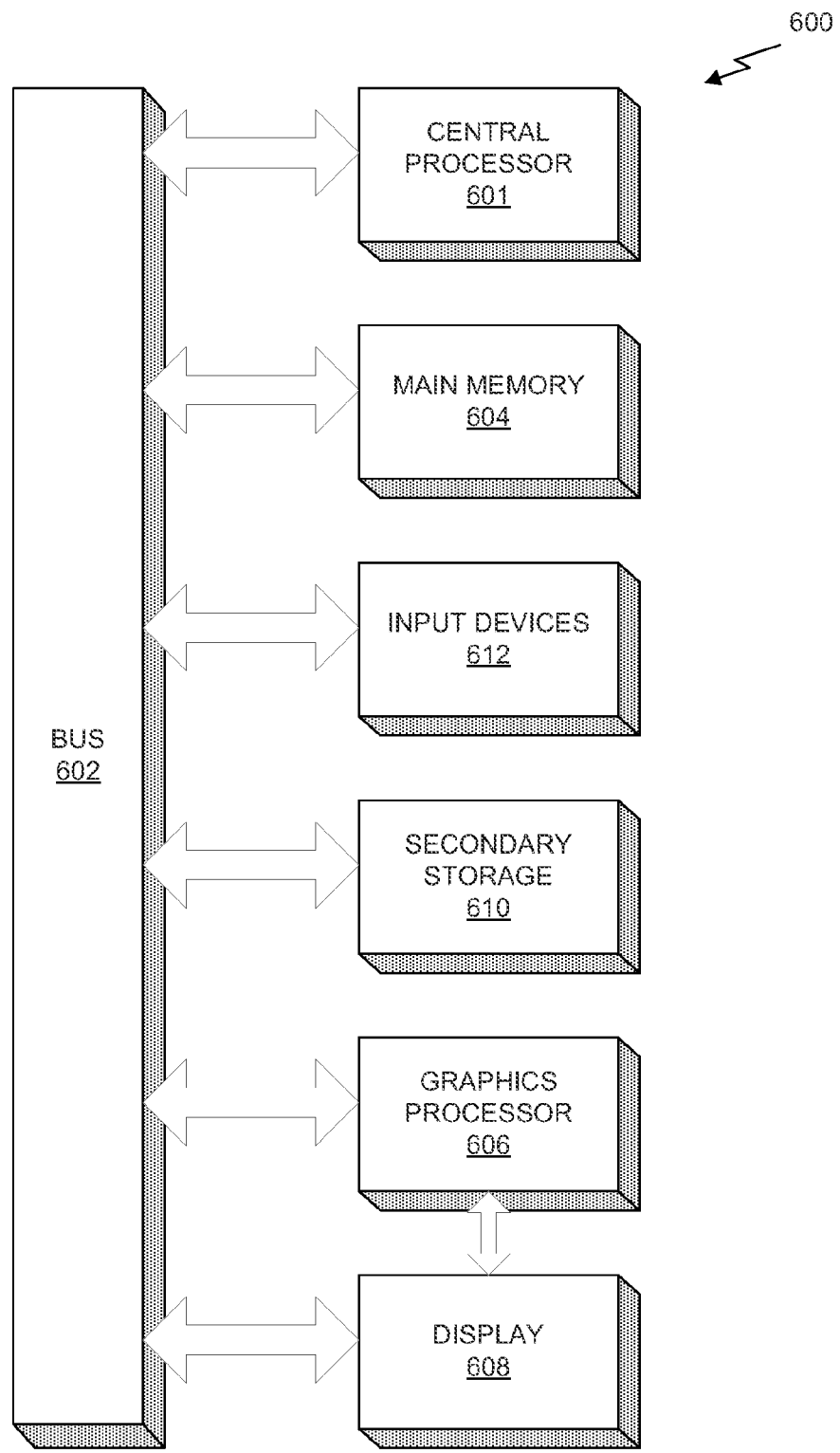
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   receiving a first fragment;
   shading the first fragment; and
   while the first fragment is being shaded:
      receiving a second fragment,
      determining whether at least one aspect of the second fragment conflicts with the first fragment,
      if it is determined that the at least one aspect of the second fragment does not conflict with the first fragment, shading the second fragment,
      if it is determined that the at least one aspect of the second fragment conflicts with the first fragment:
         storing information associated with the second fragment,
         receiving a third fragment, and
         shading the third fragment, if it is determined that at least one aspect of the third fragment does not conflict with the first fragment,
   wherein the shading of the third fragment is performed in association with a first warp that is associated with the shading of the first fragment, only if coordinates associated with the third fragment fail to conflict with coordinates associated with the first fragment.

2. The method of claim 1, wherein the at least one aspect includes a position.

3. The method of claim 1, wherein the at least one aspect includes pixel coverage.

4. The method of claim 1, wherein the determination whether the at least one aspect of the second fragment conflicts with the first fragment includes a hierarchical determination.

5. The method of claim 1, wherein the determination whether the at least one aspect of the second fragment conflicts with the first fragment includes a first determination whether at least one coordinate of the second fragment conflicts with at least one coordinate associated the first fragment.

6. The method of claim 5, wherein the determination whether the at least one aspect of the second fragment conflicts with the first fragment further includes a second determination whether a pixel coverage of the second fragment conflicts with a pixel coverage associated the first fragment.

7. The method of claim 6, wherein the first determination precedes the second determination.

8. The method of claim 1, further comprising identifying at least one coordinate associated with the first fragment.

9. The method of claim 8, further comprising indicating a receipt of the at least one coordinate associated with the first fragment.

10. The method of claim 9, wherein indicating the receipt of the at least one coordinate associated with the first fragment includes setting a bit.

11. The method of claim 9, wherein indicating the receipt of the at least one coordinate associated with the first fragment includes storing a value associated with the at least one coordinate.

12. The method of claim 1, further comprising assigning a value to the first fragment.

13. The method of claim 12, further comprising incrementing a counter associated with fragment coordinates.

14. The method of claim 13, further comprising causing an exit of a critical processing section associated with the first fragment when the counter associated with fragment coordinates is equal to the value assigned to the first fragment.

15. The method of claim 1, wherein the first fragment is received by a pixel shader in a first order and released by the pixel shader in a second order different from the first order.

16. The method of claim 1, wherein a pixel shader interlock is configured to perform the determining.

17. The method of claim 16, wherein a queue associated with the pixel shader interlock is configured to perform the storing.

18. A non-transitory computer readable medium storing instructions that, when executed by a processor, cause the processor to perform steps comprising:
   receiving a first fragment;
   shading the first fragment; and
   performing, while the first fragment is being shaded, the following operations:
      receiving a second fragment,
      determining whether at least one aspect of the second fragment conflicts with the first fragment,
      if it is determined that the at least one aspect of the second fragment does not conflict with the first fragment, shading the second fragment,
      if it is determined that the at least one aspect of the second fragment conflicts with the first fragment:
         storing information associated with the second fragment,
         receiving a third fragment, and
         shading the third fragment, if it is determined that at least one aspect of the third fragment does not conflict with the first fragment,
   wherein the shading of the third fragment is performed in association with a first warp that is associated with the shading of the first fragment, only if coordinates associated with the third fragment fail to conflict with coordinates associated with the first fragment.

19. An apparatus, comprising:
a processor configured for:
- receiving a first fragment;
- shading the first fragment; and
- while the first fragment is being shaded:
  - receiving a second fragment,
  - determining whether at least one aspect of the second fragment conflicts with the first fragment,
  - if it is determined that the at least one aspect of the second fragment does not conflict with the first fragment, shading the second fragment,
  - if it is determined that the at least one aspect of the second fragment conflicts with the first fragment:
    - storing information associated with the second fragment,
    - receiving a third fragment, and
    - shading the third fragment, if it is determined that at least one aspect of the third fragment does not conflict with the first fragment,
- wherein the shading of the third fragment is performed in association with a first warp that is associated with the shading of the first fragment, only if coordinates associated with the third fragment fail to conflict with coordinates associated with the first fragment.

* * * * *